No. 845,459. PATENTED FEB. 26, 1907.
J. M. GILSTRAP.
ELEVATED ELECTRIC RAILWAY.
APPLICATION FILED JULY 31, 1906.
5 SHEETS—SHEET 1.
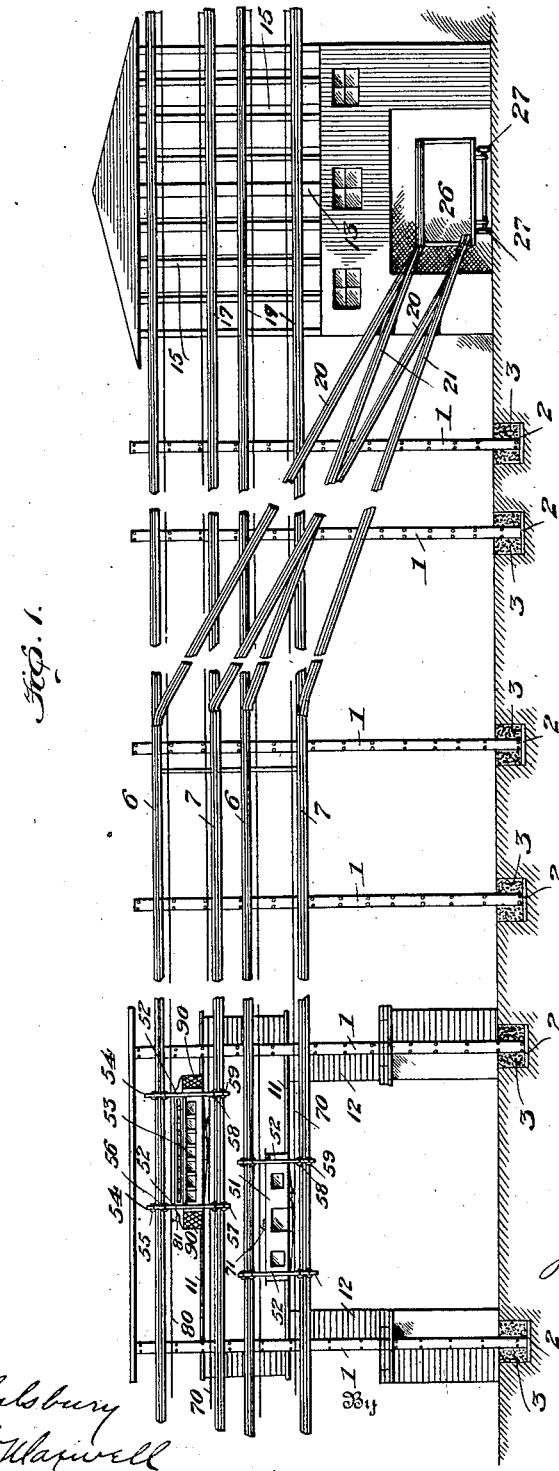

No. 845,459. PATENTED FEB. 26, 1907.
J. M. GILSTRAP.
ELEVATED ELECTRIC RAILWAY.
APPLICATION FILED JULY 31, 1906.
5 SHEETS—SHEET 2.
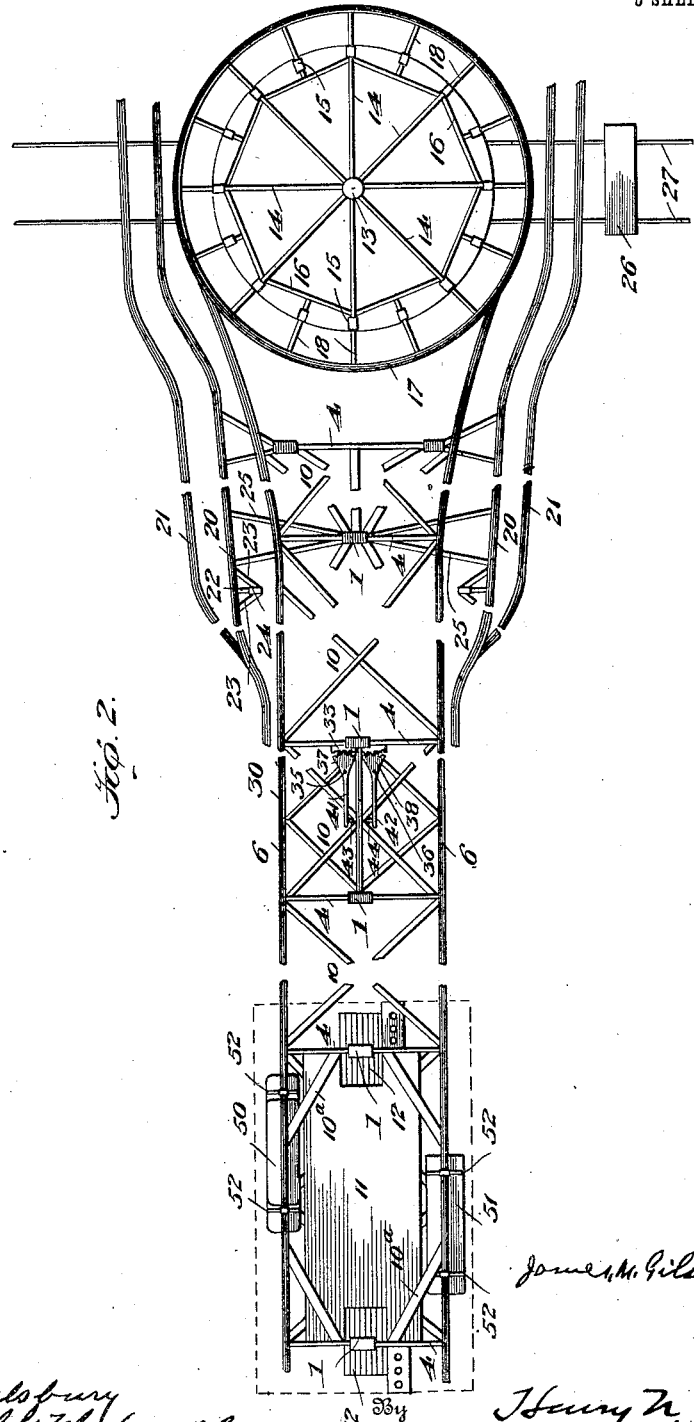

No. 845,459. PATENTED FEB. 26, 1907.
J. M. GILSTRAP.
ELEVATED ELECTRIC RAILWAY.
APPLICATION FILED JULY 31, 1906.
5 SHEETS—SHEET 3.
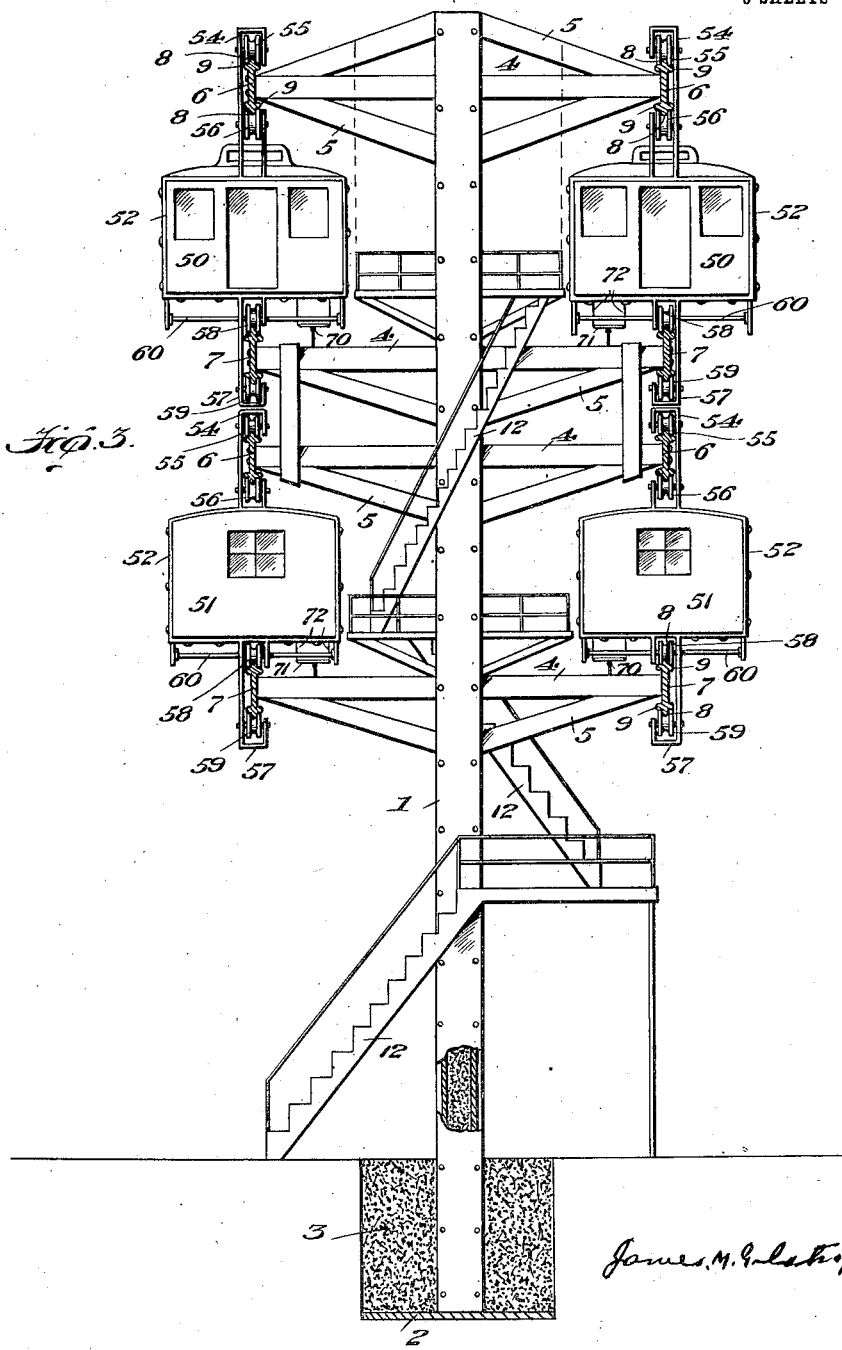

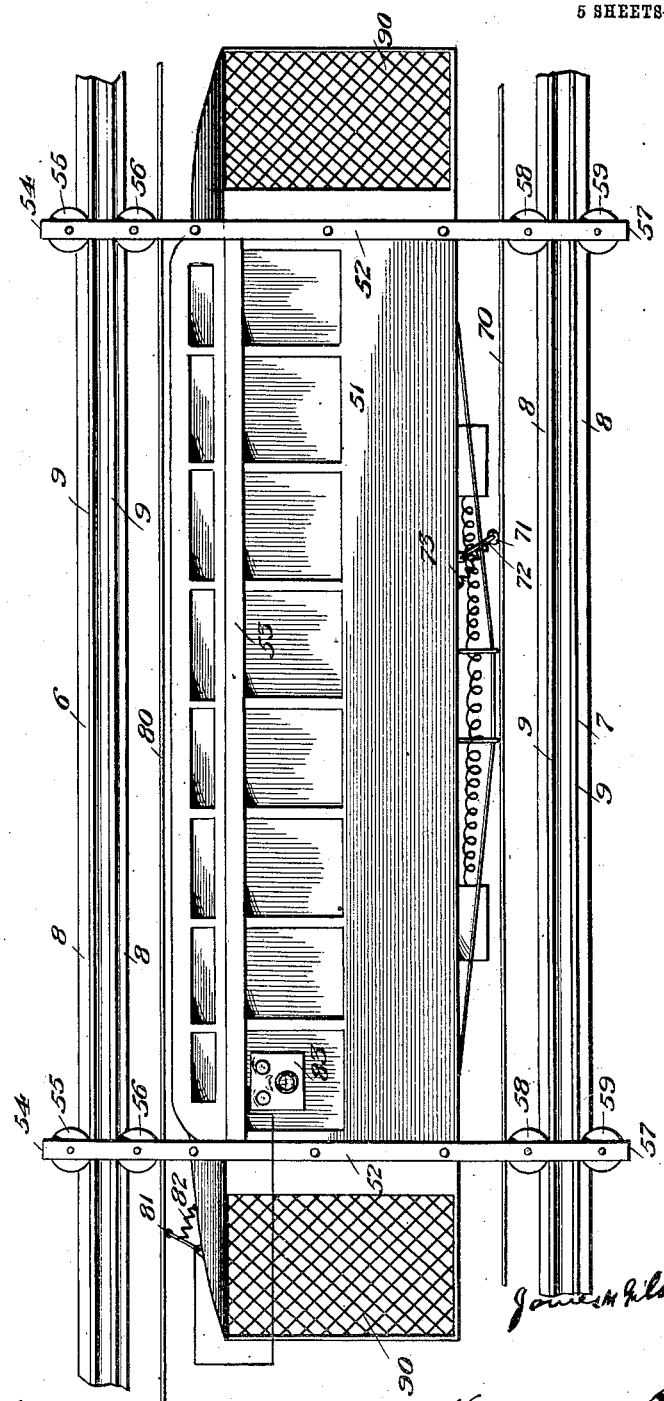

No. 845,459. PATENTED FEB. 26, 1907.
J. M. GILSTRAP.
ELEVATED ELECTRIC RAILWAY.
APPLICATION FILED JULY 31, 1906.
5 SHEETS—SHEET 5.
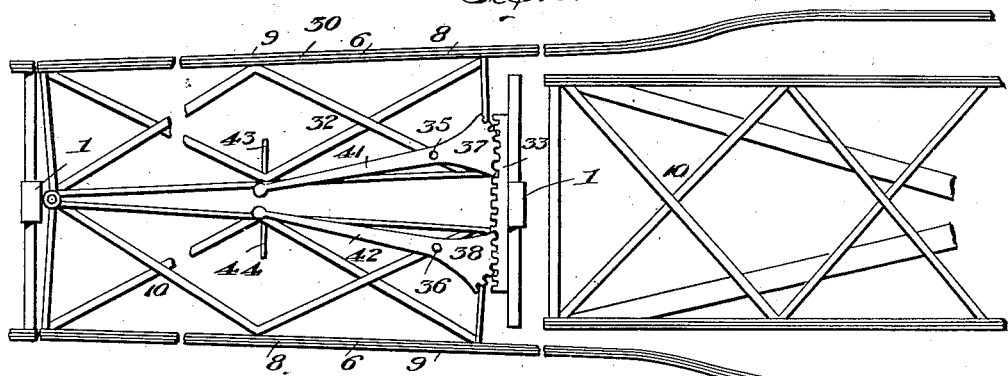
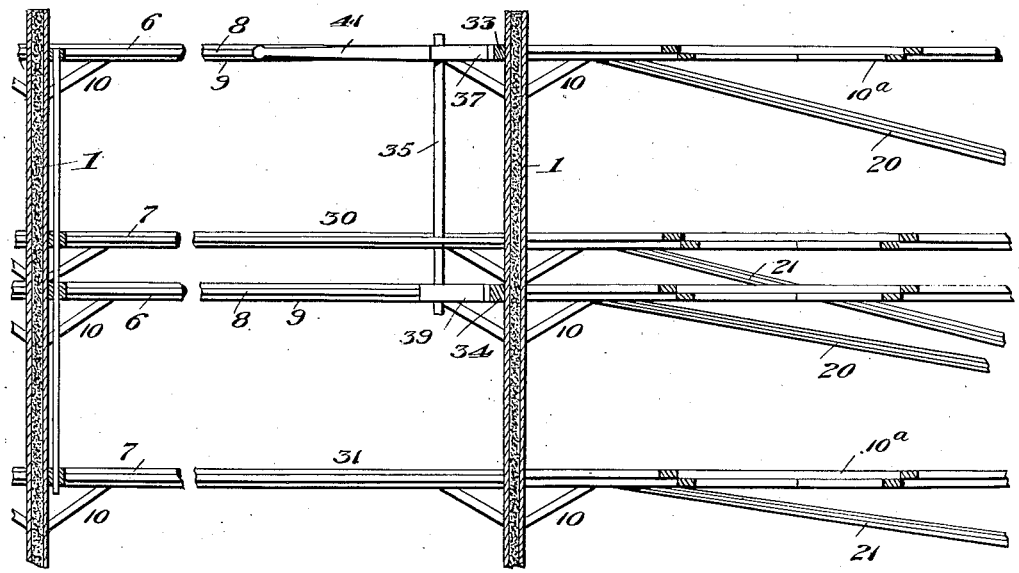
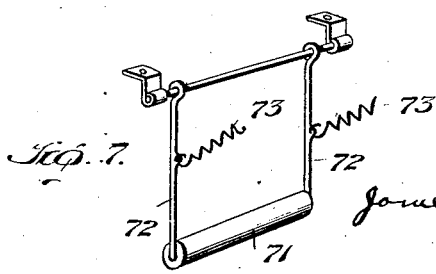

UNITED STATES PATENT OFFICE.

JAMES M. GILSTRAP, OF OAKLAND, CALIFORNIA.

ELEVATED ELECTRIC RAILWAY.

No. 845,459.   Specification of Letters Patent.   Patented Feb. 26, 1907.

Application filed July 31, 1906. Serial No. 328,506.

*To all whom it may concern:*

Be it known that I, JAMES M. GILSTRAP, a citizen of the United States, residing at Oakland, county of Alameda, and State of California, have invented certain new and useful Improvements in Elevated Electric Railways, of which the following is a specification.

My invention relates to elevated electric railways.

The objects of the present invention are the provision of an elevated railway which will occupy a minimum area along the right of way and at the stations and terminals; which will have an improved terminal arrangement whereby machine-shops, car-barns, and other properties which ordinarily require additional ground-space may be arranged one above the other at the terminals, thereby greatly economizing on the required acreage; to provide novel supporting-columns for the rails; a novel arrangement of braces and supports for the rails themselves; make provision for upper and lower tracks, so that both freight and passenger service may be carried on; provide for novel means of sustaining the cars from the tracks, so that the strains are distributed to the best advantage; derailment prevented; great speed rendered possible with minimum vibration, and bracing of the car-bodies obtained.

Other objects of the invention are the provision of novel switches; turn-table facilities for enabling the cars to be run continuously without reversal; improved trolley means for conducting the electrical current to the cars; novel means whereby telephonic communication may be had with the cars and from the cars to other points for the convenience of the passengers and for signaling, if desired; and the invention otherwise has for its aims the provision of an elevated street-railway system which will be of comparatively low cost of installment and maintenance and will provide for the greatest convenience and safety of its passengers and rapidity of transportation of passengers and freight.

The invention is set forth fully hereinafter, and the novel features are recited in the claims.

In the accompanying drawings, Figure 1 is a side elevation illustrating a station and a terminal; Fig. 2, a plan view of Fig. 1; Fig. 3, an end elevation, partly in section; Fig. 4, a detail side elevation of a passenger-car; Fig. 5, a detail plan view of a switch; Fig. 6, a vertical section of Fig. 5, and Fig. 7 a detail of the trolley.

At suitable distances apart the elevated structure is supported by columns or posts 1 of box-like form made of metal plates riveted or bolted together. These posts are sunk several feet in the ground in an enlarged hole at the bottom of which is first placed a steel plate 2, on which the columns 1 rest. Concrete or cement 3 is filled in the hole around the post and tamped. The post 1 is also filled with concrete or cement, which is firmly tamped therein from top to bottom. This causes great rigidity and strength, as well as long life, to the posts or columns. Extending laterally from the supporting-columns 1 are arms 4, which are riveted or bolted to the side flanges of the columns and are sustained by braces 5. The cross-arms 4 are of box-like or hollow construction, and the braces 5 may also be similarly made.

As the cars are suspended from above and supported from beneath, upper and lower tracks 6 and 7 are provided. These tracks have central guard-flanges 8 above and below and lateral double-tread flanges 9 above and below. It will be understood that an upper track 6 and a lower track 7 on one side of the posts or columns 1 constitute the track construction for cars traveling on that side. The upper sets of tracks are for passenger-cars and the lower tracks for freight-cars. Intermediate the posts or columns 1 the tracks are braced by crossed braces 10.

Where a station is provided, the tracks are spread farther apart, being still connected by the cross-braces 10; but additional braces 10ª are provided. Extending from one column to the next one, where the station is provided, is a platform 11, along opposite sides of which the cars run on the respective tracks. The passengers have access to the platform 11 by spiral stairways 12, which wind around the columns 1 at opposite ends of the platform 11 and lead thereto from the street. The stairway at one end of the station being used for ascending passengers and the stairway at the other end for descending passengers, the first stairway will be controlled from the booth or ticket-office by an automatic lever which operates a gate or door at the foot of the stairs, so that the ticket agent may open the gate to admit the proper persons, but to exclude others. Provision may also be made for passengers to reach the platforms 11 by having an elevator in the building opposite the station and providing a screened gangway from the elevator to the track with a telescopic gangway to run out to connect with the car on the opposite side of the track when desired.

At the terminals of the railway I provide a central column 13, from which radiate beams 14 to smaller columns 15, said beams 14 being connected by braces 16. A circular track 17 is supported from the columns 15 by arms 18, and the tracks are gradually spread and merge into the circular track 17, which constitutes a turn-table by which the cars may be run around onto the opposite track for the return trip. Underneath the circular track 17 is a similar track 19 to serve as a turn-table for the freight-cars. Underneath the turn-table 19 is the car-barn and machine-shop.

To enable the passenger and freight cars to be run down from their respective tracks to the car-barn, there are provided the upper side tracks 20 for the passenger-coaches and the lower side tracks 21 for the freight-cars, said side tracks being supported by arms 22 and braces 23, extending from columns 24, and the side tracks are also braced from the central columns 1 by braces 25.

The cars can be run down the side tracks and onto transfer-trucks 26, running on tracks 27, and thus the cars may be transferred into the car-barn and machine-shop.

To enable the cars to be switched onto the side tracks 20 and 21, there are provided switches 30 and 31, which are suitably braced at 32 and extend from the cross-arms of one pillar or column 1 to an adjacent pillar or column 1, the columns 1 being here placed comparatively close together. The switch-sections are adapted to move in opposite directions to connect with the respective side tracks 20, and the switches of both the passenger and freight tracks are shifted at the same time. To effect the movement of the switches, I provide racks 33 and 44, secured at the proper heights to the columns 1 adjacent the switch-points, and suitably journaled to the braces of the switch-sections are vertical shafts 35 and 36, carrying upper gear-segments 37 and 38 and lower gear-segments 39 and 40, gear-segments 37 and 38 meshing with the rack 33 and gear-segments 39 and 40 meshing with the rack 34. Levers 41 and 42 are secured to the shafts 35 and 36 for rocking the gear-segments, and these levers are locked by the locking mechanism 43 and 44 to hold the switches where shifted.

The passenger-cars are shown at 50, and the freight-cars at 51. Metal straps 52 encircle the car-bodies at desired points thereof and are connected by longitudinally-extending straps 53. Extending upwardly from the center of the straps 52 are hangers 54, carrying upper and lower traction-wheels 55 and 56, which are grooved to fit vertical and lateral flanges 8 and 9 of the track-rails above and below.

Secured to the straps 52 underneath the car are supporting-hangers 57, carrying wheels 58 and 59 to travel on the upper and lower flanges of the track-rails. These hangers are braced and secured to the car-body by braces 60. This construction prevents any vertical or lateral movement of the traction-wheels or of the car and renders accidents from jumping of the track impossible, also minimizing vibration and insuring ease of travel.

A third rail or electrical conductor 70 is suitably supported along the trackway, and the trolley which runs thereon is composed of a roller 71, journaled to arms or hangers 72, which are pivoted to the car, and the trolley is held in contact with the third rail by a spring 73. The roller 71 is broad, so that when the car turns curves said trolley will always remain in contact with the third rail.

A stationary electrical conductor 80 is suspended above the cars and forms a trunkline to the telephone-exchange system of the city or other desired point, and with this conductor a trolley 81, carried by the car, contacts and is held thereagainst by a spring 82. A telephone 83, carried by the car, enables the passengers, motormen, and conductors to be in constant communication with any desired persons for the convenience of the passengers or to enable the motormen and conductors to receive orders from the superintendent of the road.

The cars have lattice-work or lazy-tong gates 90 at the vestibules thereof which are locked by the conductor, so that it is impossible for a passenger to fall from the car when in motion, the gates being opened by the conductor when a station is reached.

Having thus described my invention what I claim as new, and desire to secure by Letters Patent, is—

1. In an elevated railway, the combination with a supporting-column, of a landing supported thereby, and a spiral stairway surrounding and supported by the column and leading to the landing.

2. In an elevated railway, the combination with columns located along the line of the railway, of a landing supported by said columns, and separate approaches located adjacent the respective columns.

3. In an elevated railway, the combination with columns located along the line of the railway, of a landing supported by said columns, and separate stairways supported by the respective columns.

4. In an elevated railway, the combination with columns having upper and lower lateral trackway-supports, of upper and lower trackways connected, respectively, to said upper and lower trackway-supports, a car, a pair of upper and lower car-wheels connected to the car and traveling on the upper and lower parts of the upper trackway, and a pair of upper and lower car-wheels connected to the car and traveling on the upper and lower parts of the lower trackway.

5. In an elevated railway, the combination with columns having upper and lower lateral trackway-supports, of upper and lower trackways each comprising upper and lower vertical flanges and lateral flanges and connected, respectively, to said upper and lower trackway-supports, a car, a pair of upper and lower car-wheels connected to the car and grooved to conform to the upper trackway and traveling thereon, and a pair of upper and lower car-wheels connected to the car and grooved to conform to the lower trackway and traveling thereon.

6. In an elevated railway, the combination with upper and lower trackways and supports therefor, of a car, bands or straps encircling the car at different points thereof, upper and lower car-wheels connected to the tops of said bands and traveling on the upper trackway, and upper and lower car-wheels traveling on the lower trackway.

7. An elevated railway having going and returning track-rails merging into a circular terminal track-rail.

8. An elevated railway having upper and lower going and returning track-rails for a train or car to travel on, and upper and lower circular terminal track-rails merging into said upper and lower going and returning track-rails.

9. An elevated railway having going and returning tracks merging into a circular terminal track, and a side track leading to another level of the terminal.

10. An elevated railway having going and returning tracks merging into a circular terminal track, side tracks leading, respectively, from the going and returning tracks to another level of the terminal, and means for transferring the car from one side track to the other.

11. An elevated railway having going and returning tracks merging into a circular terminal track, side tracks leading, respectively, from the going and returning tracks to opposite sides of the terminal at another level thereof, and means for transferring the car from one side track to the other transversely of the terminal track.

12. In an elevated railway, the combination with supporting-columns, of upper and lower trackways representing different railroads, of upper and lower trackways representing different railroads corresponding to the aforesaid railroads, upper and lower switches connected together and adapted for simultaneous shifting or throwing, and means for simultaneously shifting or throwing said connected switches.

13. In an elevated railway, the combination with upper and lower trackways and supports therefor, of a car, bands or straps encircling the car at different points thereof, car-wheels connected to the tops of said bands and traveling on the upper trackway, and car-wheels traveling on the lower trackway.

14. In an elevated railway, the combination with columns having upper and lower lateral trackway-supports, of upper and lower trackways, each comprising a vertical flange and lateral flanges and connected, respectively, to said upper and lower trackway-supports, a car, car-wheels connected to the car and grooved to conform to the upper trackway and traveling thereon, and car-wheels connected to the car and grooved to conform to the lower trackway and traveling thereon.

In testimony whereof I hereunto affix my signature in presence of two witnesses.

JAMES M. GILSTRAP.

Witnesses:
 L. L. M. SALSBURY,
 EDWARD G. MAXWELL.